(12) United States Patent
Mallitzki

(10) Patent No.: US 10,294,041 B2
(45) Date of Patent: May 21, 2019

(54) CONTAINER CLAMPING AND HOLDING ARRANGEMENT FOR MOVING CONTAINERS, SUCH AS BOTTLES, CANS, AND SIMILAR CONTAINERS, FOR HOLDING PRODUCTS, SUCH AS BEVERAGES

(71) Applicant: Nils Mallitzki, Simmern (DE)

(72) Inventor: Nils Mallitzki, Simmern (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/584,296

(22) Filed: May 2, 2017

(65) Prior Publication Data

US 2017/0334664 A1    Nov. 23, 2017

Related U.S. Application Data

(63) Continuation-in-part of application No. PCT/EP2015/073328, filed on Oct. 9, 2015.

(30) Foreign Application Priority Data

Nov. 3, 2014  (DE) .......................... 10 2014 116 004

(51) Int. Cl.
   *B65G 47/86*        (2006.01)
   *B25J 15/12*        (2006.01)
   (Continued)

(52) U.S. Cl.
   CPC ............ *B65G 47/847* (2013.01); *B25J 15/12* (2013.01); *B65G 47/908* (2013.01);
   (Continued)

(58) Field of Classification Search
   CPC .... B65G 47/842; B65G 47/847; B65G 47/90; B65G 2201/0235; B65G 2201/0244;
   (Continued)

(56) References Cited

U.S. PATENT DOCUMENTS 3,929,367 A * 12/1975 Bjurling .................... B25J 15/00
                                                        294/100
4,858,980 A *  8/1989 Dreisig .............. B23Q 3/15526
                                                        24/545

(Continued)

FOREIGN PATENT DOCUMENTS

DE       14 81 752        3/1969
DE       32 21 964        2/1983

(Continued)

*Primary Examiner* — Dean J Kramer
(74) *Attorney, Agent, or Firm* — Nils H. Ljungman & Associates

(57) ABSTRACT

A container clamping and holding arrangement for moving containers, such as bottles, cans, and similar containers, for holding products, such as beverages. The abstract of the disclosure is submitted herewith as required by 37 C.F.R. § 1.72(b). As stated in C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

17 Claims, 5 Drawing Sheets

(51) Int. Cl.
*B65G 47/90* (2006.01)
*B67C 3/24* (2006.01)

(52) U.S. Cl.
CPC .............. *B65G 2201/0235* (2013.01); *B65G 2201/0244* (2013.01); *B65G 2201/0247* (2013.01); *B67C 3/242* (2013.01)

(58) Field of Classification Search
CPC ............ B65G 2201/0247; B67C 3/242; B25J 15/022; B25J 15/086; B25J 15/12
USPC ....................................................... 294/99.1
See application file for complete search history.

(56) References Cited

U.S. PATENT DOCUMENTS

| | | | |
|---|---|---|---|
| 6,079,541 A * | 6/2000 | Bercelli | ................. B08B 9/426 198/377.03 |
| 8,297,671 B2 * | 10/2012 | Knieling | .............. B65G 47/847 294/198 |
| 8,424,940 B2 * | 4/2013 | Sarda | .................... B65G 47/847 294/90 |
| 8,672,376 B1 | 3/2014 | Wilson et al. | |
| 2006/0043749 A1 | 3/2006 | Huang et al. | |

FOREIGN PATENT DOCUMENTS

| | | |
|---|---|---|
| DE | 197 40 891 | 3/1999 |
| DE | 10 2006 033 512 A1 | 1/2008 |
| EP | 2 138 434 A1 | 12/2009 |
| WO | WO 2009/118579 | 10/2009 |
| WO | WO 2014/026747 | 2/2014 |

* cited by examiner

CONTAINER CLAMPING AND HOLDING ARRANGEMENT FOR MOVING CONTAINERS, SUCH AS BOTTLES, CANS, AND SIMILAR CONTAINERS, FOR HOLDING PRODUCTS, SUCH AS BEVERAGES

CONTINUING APPLICATION DATA

This application is a Continuation-In-Part application of International Patent Application No. PCT/EP2015/073328, filed on Oct. 9, 2014, which claims priority from Federal Republic of Germany Patent Application No. 10 2014 116 004.5, filed on Nov. 3, 2014. International Patent Application No. PCT/EP2015/073328 was pending as of the filing date of this application. The United States was an elected state in International Patent Application No. PCT/EP2015/073328.

BACKGROUND

1. Technical Field

The present application relates to a container clamping and holding arrangement for moving containers, such as bottles, cans, and similar containers, for holding products, such as beverages.

2. Background Information

Background information is for informational purposes only and does not necessarily admit that subsequently mentioned information and publications are prior art.

Container clamps are used for grasping containers, for example, beverage containers. In this situation, the container clamps can be arranged in a transport star or starwheel, or in another type of carrier, which is installed in a container treatment system. The container clamps are positioned to grasp containers, such as a bottle or can for beverages, and to hold and guide them during transport through the container treatment system.

Such container clamps are known. Some types of container clamps comprise two clamp arms which are configured such as to correspond to one another. Each of the pair of clamp arms is rotatably mounted on a rotational axis. Each of the container clamps further comprises a gripper section for grasping the containers and a control section located opposite the gripper section for controlling the clamp arms. The pivot movement of the clamp arms, i.e., the opening and closing of the clamp arms, is carried out by a spring and a joint connection positioned at the control section, wherein the movement is initiated by means of a control rod connected to the joint connection. In this situation, the opening of the container clamps usually takes place by a drawing movement on the control rod in the direction away from the gripper section, and closing in the reverse direction.

These types of container clamps can exhibit the disadvantage that a simple and reliable centering of the container in the middle or centered position between the clamp arms is not essentially ensured. In addition, the structural configuration of the container clamps and of the control arrangement can be rather elaborate, as a result of which the cleaning of the container clamps can be difficult. Further, a container clamp exchange can be quite time-consuming, since both the bearing arrangement of the container clamps as well as the control rod must be or should be dismantled and reinstalled later.

OBJECT OR OBJECTS

An object of the present application is to provide a container clamp that can be easily exchanged and easily cleaned, and which is designed to promote an automatic and exact or essentially exact centering of the container in the container clamps.

SUMMARY

The object may be achieved by a container clamp according to at least one exemplification disclosed herein. In this context, the features described are in principle the object of the present application, alone or in any desired combination, regardless of their summary in the claims or reference to them.

The container clamp for grasping a container, according to one possible exemplification, comprises at least two clamp arms, which in each case are mounted such as to be movable over a single longitudinal axis on a carrier, between a position of rest and an opening position. The container clamp also includes a double-elbow lever connected to the clamp arms, with a first and a second elbow lever, wherein both elbow levers are connected to a coupling unit, which is elastic in the direction of a centering axis.

The container clamp according to one possible exemplification has a relatively simple structural configuration, and comprises exclusively two bearing axes with a carrier, as a result of which simple and rapid maintenance of the container clamp is possible.

Due to the double-elbow lever with the coupling unit, the container clamp still maintains its exact or essentially exact radial alignment during operation, and mutual displacement of the clamp arms is prevented and/or restricted and/or minimized, which would result in imprecise positioning of the containers in the container clamp.

Each container is therefore grasped automatically in the middle position of the container by the clamp arms. The phrase "middle position of the container" should be understood to mean a position of the container which is exactly or essentially exactly in the middle between the clamp arms. That is to say, the container is in the middle position with its longitudinal axis arranged exactly or essentially exactly above the centering axis of the container clamps. In other words, according to one exemplification, the container is in a middle position when the longitudinal or central or rotational axis of the container intersects the centering axis of the container clamp holding the container.

The phrase "centering axis" should be understood to mean a middle axis of each container clamp which runs centrally between the clamp arms. In one exemplification, a plurality of container clamps can be positioned on the perimeter of a transport star or starwheel. In this arrangement, the centering axis of each container clamp extends radially or essentially radially or substantially radially with respect to the rotational axis of the transport star.

The phrase "double-elbow lever" should be understood to mean two individual elbow levers, which are arranged one behind the other in the direction of the centering axis of the container clamps. Each elbow lever comprises two lever arms, with a joint section arranged between the lever arms. The coupling unit connects together the two elbow levers arranged one behind the other. Due to the double-elbow lever and the coupling unit, a displacement of the elbow levers against one another transverse to the centering axis is prevented and/or restricted and/or minimized. That is to say, due to the double-elbow lever and the coupling unit the clamp arms can be moved by the same angle difference towards one another or away from one another. Regardless of their starting position, such as a position of rest or an opening position, the double-elbow lever and the coupling unit therefore have the effect that the clamp arms are always or essentially always or substantially always aligned and moved mirror-symmetrically or essentially mirror-symmetrically or substantially mirror-symmetrically to one another. According to this exemplification, there is no further or additional bearing arrangement or fixed connection of the double-elbow lever to an external reference component, and there are no further or additional adjustment devices present for the exact or essentially exact or precise or substantially precise or fine positioning of the clamp arms.

The term "elastic" should be understood to mean that, after a radial deflection from a first position into a second position, the coupling unit, or individual components of the coupling unit, revert back into the first position. The coupling unit and/or individual components thereof could also be considered to be resilient structures in that they return to their original shape or initial position after a temporary deformation.

The phrase "grasping a container" should be understood to mean the complete holding of the container by means of the container clamp, i.e., the container clamp is configured in such a way that it grips around a portion of the container and holds the container own its own. For example, in the case of a bottle, the container clamp could grip around the neck of a bottle to hold and support the bottle on its own. It should be understood that the terms "container" or "containers" refer to many different types of containers, such as bottles, cans, and containers similar to bottles and cans, which can be used to container different materials and/or products, such as beverages. Such containers can be made from different materials, such as plastic, PET, metal, aluminum, and glass.

The phrases "position of rest" or "rest position" should be understood to mean a position in which the two clamp arms are in contact with one another and arranged mirror-symmetrically about the centering axis of the container clamp. The phrase "opening position" or "open position" should be understood to mean at least one position in which the clamp arms are deflected out of the position of rest, and in which a container can be guided between the clamp arms. The clamp arms, in one possible exemplification, can be moved into a plurality of different open positions.

The term "carrier" should be understood to mean a format star, a transport star, a starwheel, or a similar device for the transporting of containers, such as beverage containers.

According to another exemplification, the double-elbow lever can be mounted exclusively on the clamp arms. To further explain, the container clamp according to one exemplification comprises two bearing arrangements, one for each clamp arm. The bearing arrangements position the two clamp arms on the carrier or starwheel by their respective bearing axle or pin. There is no further fixed connection of the container clamp to the carrier. As a result of this, in one possible exemplification the installation and dismantling of the container clamp, for example in the event of a change of container or a maintenance procedure, can be simplified. The container clamp can also be cleaned relatively easily due to the few regions of connection to the carrier. In other words, since the bearing arrangements, in one exemplification, can form the connection or mounting points between the clamp arms and the carrier structure, relatively quick installation of the clamp arms onto the carrier is facilitated. Likewise, this individual connection promotes relatively quick removal of the clamp arms when desired. Such a design can be advantageous, such as when switching from handling one type of container to another. In that situation, it can be necessary or may be desired to switch the type of container clamps being used. For example, a first type of container clamp may be designed to handle a first type of container, and a second type of container clamp may be designed to handle a second type of container. In that situation, when there is a switch from handling the first type of container to the second type of container, it is necessary or may be desired to remove all or substantially all of the first type of container clamp and then install the second type of container clamp. The design of the bearing arrangements can make this a relatively quick and simple process in order to minimize downtime of the handling machine.

In order to promote a relatively exact and automatic alignment of the clamp arms, provision is made according to a further exemplification of the present application for a coupling unit for producing a compressive stress to be arranged between the elbow levers. The compressive stress exerts the effect in this situation that the elbow levers are pushed apart from one another, such that, by the connection of the elbow levers to the clamp arms, the clamp arms are moved automatically into the position of rest, or, respectively, are held in this position. In this situation, the coupling unit can be configured in such a way that a compressive stress is permanently or essentially permanently exerted, and therefore also in the position of rest. As an alternative, provision can also be made that in one position, such as the position of rest, the coupling unit is free of stress, and it is after the deflection of the clamp arms that a compressive stress is imposed in the coupling position. In other words, the coupling unit can be designed, according to at least one exemplification, to generate or exert a pressing force that urges or pushes the elbow levers apart from one another. As a result, the control ends of the clamp arms are also pushed apart. When the control ends are pushed apart, the clamping portions of the clamp arms are urged or pushed toward one another until they reach the so-called "rest" position. The rest position could also be thought of as a closed position or a contact position. In this position, the clamp arms may be moved into contact with one another such that the clamp arms are prevented and/or restricted and/or minimized from moving any further toward one another. When no container is present, the clamp arms are essentially closed when in the rest position. In one possible exemplification, the coupling unit could be designed such that when the clamp arms are in the rest position, no force or essentially no force or substantially no force or very little force is exerted on the elbow levers and the clamp arms, and thus the clamp arms are in a rest position or unstressed position.

For the configuration of the coupling unit, provision is made according to a further exemplification that the coupling unit comprises a spring bridge arranged at the first elbow lever, and a spring arm connected to the spring bridge and the second elbow lever.

The term "spring bridge" should be understood to mean a component which is connected by two sections, for example to each arm of the first elbow lever. The spring bridge can be configured, for example, as a one-piece structure integral with the elbow lever. The spring bridge can also be configured as a separate component, and connected to the elbow lever in a detachable or non-detachable manner.

In order to influence or adjust or set the rigidity of the spring bridge, the choice of material and/or the dimensions of the spring bridge can be adjusted or selected. In one possible exemplification, openings, such as notches, can be provided in the spring bridge, by which openings or notches the rigidity of the spring bridge can be determined, adjusted, or selected.

According to another possible exemplification, the coupling unit is arranged in such a way that, at an opening movement of the clamp arms, the spring bridge and the spring arm press against one another. That is to say, the spring bridge and the spring arm can be arranged and configured in such a way that, at the opening movement of the clamp arms, the spring bridge at the first elbow lever is moved in the direction of the second elbow lever, and the second elbow lever is moved radially in the direction of the first elbow lever. At a back movement from the open position into a gripping position or position of rest, there is accordingly an opposite movement of the spring bridge and the spring arm. In this situation, for example, a compressive stress can be present in the coupling unit both during the opening movement as well as in the back movement.

The coupling unit, or at least individual components thereof, such as the spring arm and/or the spring bridge, can comprise, at least in part, an elastic or resilient material that can expand and then contract again. As an alternative, at least some individual components of the coupling unit, such as, for example, the spring arm and/or the spring bridge, due to their structural arrangement and configuration, can be movable or elastic in the radial direction. The spring arm, for example, can therefore be aligned diagonally to the plane of the container clamp, such that, at the opening movement of the clamp arms, a deflection of the spring arm takes place.

The spring arm and the spring bridge can be arranged in such a way that, at the opening movement of the clamp arms, the distance interval between the elbow levers is reduced, and at the closing movement is increased.

The spring bridge, in one exemplification, is connected in an articulated manner to two lever arms of the first elbow lever. In this situation, the spring bridge is arranged between the two elbow levers, and bridges over a joint section arranged between the lever arms of the first elbow lever. The spring bridge is configured, for example, as being flat or plate-shaped, and is aligned as perpendicular or substantially perpendicular to the plane of the container clamp. The joint section can accordingly be formed as a hinge, such as a film hinge.

In order to control the movement of the spring bridge in the radial direction in a relatively simple manner, the spring bridge can be segmented and can comprise, for example, three bridge segments marked by notches or indentations. A spring bridge with three bridge segments therefore comprises two outer bridge segments and one middle bridge segment, wherein each of the two outer bridge segments is connected to the middle bridge segment and a lever arm.

The container clamp can be configured as a passive container clamp, with which the opening of the clamp arms is effected by the introduction of the container, or as an active container clamp, with which the opening movement and/or return movement is initiated by a separate device for actuation. For this purpose, the container clamp can include a control bolt. In other words, in a passive container clamp, the clamp arms are opened by moving a container, which has a greater diameter than the space between the ends of the clamp arms, into contact with the ends of the clamp arms and thereby pushing the clamp arms apart so that the opening is expanded and the container can be inserted between the clamp arms. In contrast, in an active container clamp, another device opens the clamp arms before the container is inserted between the clamp arms, such that the space between the clamp arms is greater than the diameter of the container.

In the case of a passive container clamp, the control bolt can be configured as a support bolt, on which, for example, the first or second elbow lever is supported. For this purpose, the support bolt can be arranged on the carrier, and the elbow lever is in contact, for example, with its joint section pointing outwards in the radial direction, with the control bolt, such that the lever arms continue to be movable about the joint section, but the joint section of one of the elbow levers is mounted such that it cannot move, at least in the radial direction outwards.

With an exemplification of the container clamp as an active container clamp, the control bolt is configured such as to be actuated, for example, by a control device or a control curve or a cam structure. For this purpose, the control bolt can be connected to one of the elbow levers, such as the first elbow lever, such as at the joint section. There is no further bearing arrangement of the control bolt at the carrier, but this could be present, for example, as a sliding block guide.

According to one exemplification, the control bolt projects, for example, as a control pin or other projection out of the plane of the container clamp to permit actuation of the control bolt. In order to promote a compact structural form of the container clamp still further, the control bolt is arranged in a central region of the container clamp, for example, in a radial direction going out from the gripper section in front of the elbow levers. The arrangement of the control bolt is such that, for the opening of the container clamp, the control bolt is moved in the direction of the grip end, and in the opposite direction in order to close the container clamp.

To connect the double-elbow lever to the clamp arms, connection elements are arranged that can be formed in one piece with the lever arms and configured as securing claws. In this situation, the securing claws are matched to the shape of the clamp arm and, for example, can act as clips or clip onto the clamp arm. The clamp arm comprises additional cut-out apertures, such as, for example, a groove or elevations, to receive and accommodate the connection elements, in order to minimize or prevent an unwanted movement of the connection element at the clamp arm.

The connection elements can, for example, be formed by notches introduced into the lever arm, transverse to the longitudinal direction of the lever arm, and flexibly formed in the plane of the container clamp.

The formation of the double-elbow lever and of the coupling unit can be effected differently. For example, the first elbow lever and the coupling unit or the second elbow lever and the coupling unit can in each case be formed as one piece with each other. It is therefore possible, for example, for the first elbow lever to be formed as one piece with the spring bridge, and the second elbow lever with the spring arm. To facilitate assembly and disassembly of the double-elbow lever, as well as automatic alignment of the elbow lever in the radial direction, provision is made according to a further possible exemplification for the front elbow lever, the rear elbow lever, and the coupling element to be formed as one piece. The term "one piece" can be understood to mean that the individual components cannot be separated from one another without destruction. They are formed, for example, as monolithic, as a result of which the ease of assembly, disassembly, and cleaning can be further promoted or optimized.

For a relatively simple structural design, and in order to meet the high standards which apply, for example, to the filling of foodstuffs, provision is made according to a further possible exemplification for the double-elbow lever to be made of a plastic material. The components of container clamps are usually made of metal, since, due to the usual working speed in container treatment systems and the necessary or desired durability of the components, plastic materials are too short-lived. However, due to the fact that, by means of the double-elbow lever, a reliable guidance can be achieved, with, at the same time, relatively low forces being incurred, it is surprisingly possible for the elbow lever also to be formed of plastic. The double-elbow lever made of plastic is, in addition, relatively easy to manufacture, since it can be formed, for example, as an injection-molded component. In this situation, the manufacture and use of a one-piece double-elbow lever made of plastic in comparison with an exemplification made of metal has numerous advantages, such as, for example, low manufacturing costs and relatively easy operation.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail hereinafter on the basis of an exemplification The drawings show.

DESCRIPTION OF EXEMPLIFICATION OR EXEMPLIFICATIONS

Figure 1:
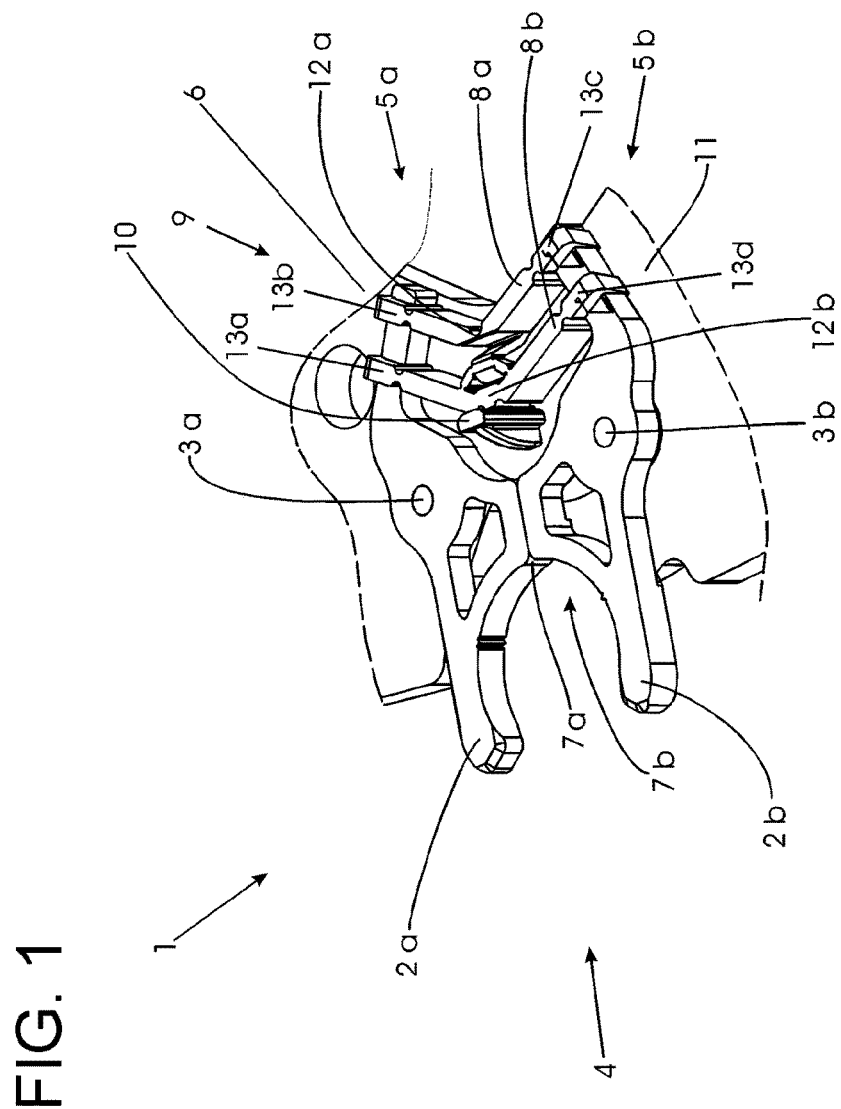
FIG. 1 shows, schematically and in a perspective representation, a section of a carrier with container clamp.

FIG. 1 shows schematically in a perspective representation a section of a carrier 11, in this case a format star, with a container clamp 1 according to the present application for the holding and guiding of containers (not represented here), such as bottles for beverages, for example, PET bottles. The container clamp 1 comprises two clamp arms 2a, 2b, formed such as to correspond to one another, which in each case are rotatably mounted by one single bearing axis 3a, 3b on the carrier 11. Each of the clamp arms 2a, 2b comprises a gripper section 4 and a control end 5a, 5b located opposite the gripper section 4. The bearing axes 3a, 3b are arranged between the gripper section 4 and the control end 5a, 5b.

In the exemplification in FIG. 1, the entire container clamp 1 is mounted exclusively on the two bearing axes 3a, 3b, and connected by them to the carrier 11. Arranged at the control end 5a, 5b is a double-elbow lever 6. The double-elbow lever 6 exhibits a pre-stress, in this case a compressive stress, which takes effect onto the control ends 5a, 5b of the container arms 2a, 2b. The double-elbow lever 6 presses the clamp arms 2a, 2b apart from each other in the region of the control ends 5a, 5b, such that the clamp arms 2a, 2b, are in a position of rest in the region of the gripper ends 4, in which they are in contact with each other with in each case a contact surface 7a, 7b. The container clamp 1 is entirely closed in the position represented in FIG. 1.

The double-elbow lever 6 includes two elbow levers 8a, 8b, arranged behind one another in the radial direction B, each of which is connected by one of their ends 13a-13d in each case to one of the control ends 5a, 5b. The elbow levers 8a, 8b comprise in each case two lever arms 15a, 15b (FIG. 3) and a joint section 16 arranged between the lever arms 15a, 15b (FIG. 3). The elbow levers 8a, 8b are connected to each other by way of a coupling unit 9 in the region of the joint sections 16. The coupling unit 9 is therefore elastic or resilient in the direction of a centering axis A (FIG. 2), i.e. in a radial direction with respect to a central rotational axis of the carrier 11.

Arranged at the first elbow lever 8a is a control bolt 10, on the side of the elbow lever 8a which is opposite the coupling unit 9. The control bolt 10 is arranged directly at the elbow lever 8a, and configured, for example, for the direct engagement of a control curve (not represented here). The container clamp according to this exemplification is an active container clamp, as described above. The control bolt 10 is therefore arranged in a central region of the container clamp 1. It is shown with its free side in the direction of the gripper section 4.

As an alternative, the control bolt 10 can also be connected to the carrier 11, and configured as a support bolt for the first elbow lever 8a. It does not then comprise, for example, any connection to the elbow lever 8a. The container clamp according to this exemplification is a passive container clamp, as described above.

Figure 2:
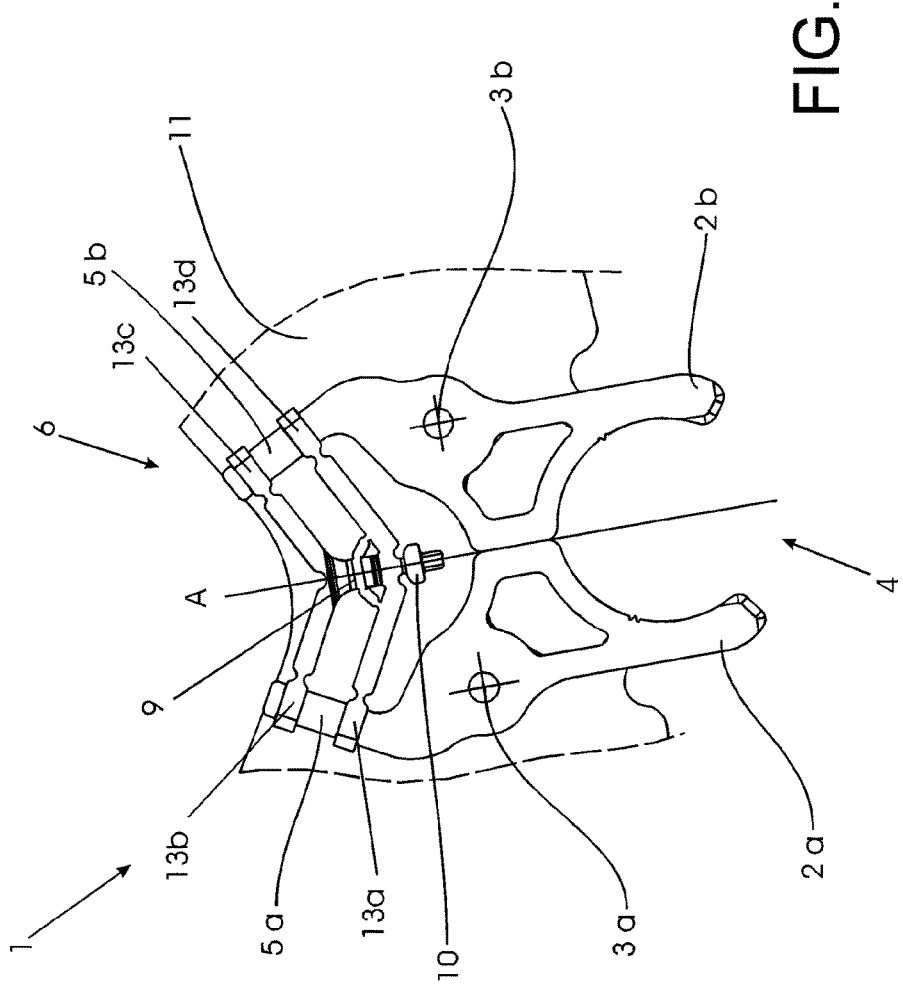
FIG. 2 shows, schematically, a view from above of the container clamp from FIG. 1.
Figure 3:
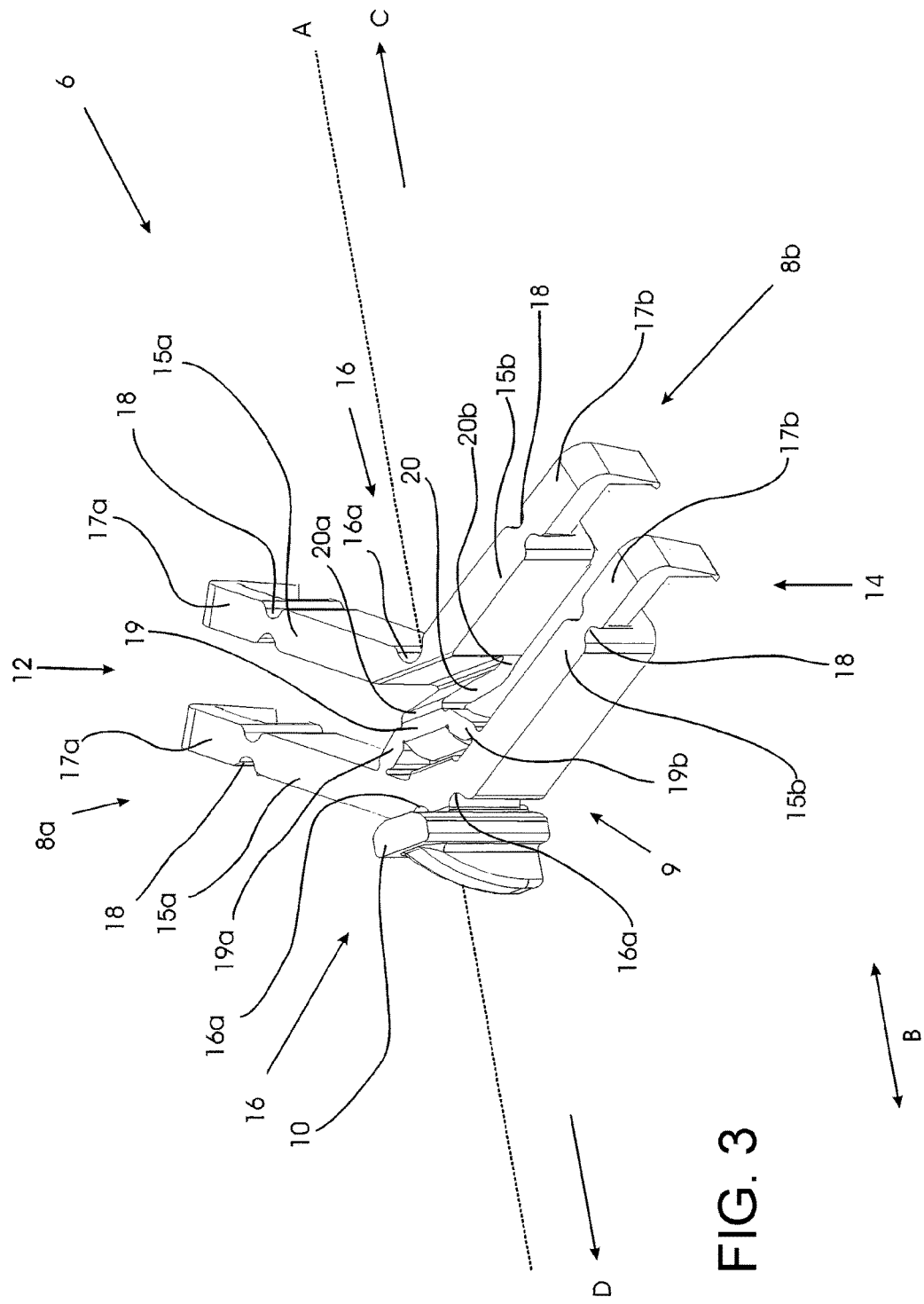
FIG. 3 shows, schematically and in a perspective representation, a double-elbow lever from FIGS. 1 and 2.

FIG. 2 shows the container clamp 1 from FIG. 1, with the two clamp arms 2a, 2b, which are connected in each case by the bearing axes 3a, 3b to the carrier 11. The clamp arms 2a, 2b, are arranged mirror-symmetrically to the centering axis A. The double-elbow lever 6 is connected to the respective control ends 5a, 5b, of the clamp arms 2a, 2b. The double-elbow levers 2a, 2b, and the coupling unit 9 are likewise arranged mirror-symmetrically about the centering axis A, i.e., the joint sections 16 lie precisely or substantially precisely or generally in the region of the centering axis A, while the lever arms 15a, 15b, extend, starting from the centering axis A, obliquely to the right and to the left in the direction of the control ends 5a, 5b. The container clamp 1 is also represented in FIG. 2 in its position of rest, in which the clamp arms 2a, 2b, are in contact with one another by way of their contact surfaces 7a, 7b.

In FIG. 1 and FIG. 2, the coupling unit 9 is formed as one piece with the double-elbow lever 6, in this case monolithic. The double-elbow lever 6 with the coupling unit 9 comprises a plastic material in order to promote ease of cleaning and to simplify manufacture and assembly.

FIG. 3 shows schematically, in a perspective representation, the double-elbow lever 6, with the first and the second elbow lever 8a, 8b, which are connected to one another by the coupling unit 9. The first elbow lever 8a comprises two lever arms 15a, 15b, which are connected as one piece to a joint section 16. Arranged at the end of the lever arms 15a, 15b, opposite the joint section 16, is a securing claw, formed as a connection element 17a, 17b, which is configured so as to engage behind at the clamp arms 2a, 2b.

Arranged in the region of the joint section 16 of the first elbow lever 8a, in addition, are two joint notches 16a, the shaping of which controls or helps control the flexural strength of the lever arms 15a, 15b, in the region of the joint section 16.

The second elbow lever 8b, corresponding to the first elbow lever 8a, comprises two lever arms 15a, 15b, which are connected to one another by means of a further joint section 16. The lever arms 15a, 15b, of the second elbow lever 8b likewise comprise, at the end opposite the joint section 16, connection elements 17a, 17b, for connecting the lever arms 15a, 15b, to the clamp arms 2a, 2b, and which are also configured as securing claws. Formed in the region of the joint section 16 is a joint notch 16a, which, at the second elbow lever 8b, forms a film hinge. The securing claws are designed such that the entire elbow lever 6, with the coupling unit 9, can be secured or clipped to the clamp arms 2a, 2b.

The rigidity of the lever arms 15a, 15b, can be adjusted by the depth of the joint notches 16a, such that, as an alternative to the exemplification shown, it is also possible for the joint notches 16a to be formed as substantially deeper in order to reduce the rigidity of the lever arms 15a, 15b, or even to form the elbow levers 8a, 8b, without joint notches in order to increase the rigidity of the lever arms 15a, 15b.

The connecting elements 17a, 17b, are configured such as to be movable transversely to the longitudinal axis direction of the lever arms 15a, 15b, and in the plane of the container clamp 1. For this purpose a notch 18, in this case a notch on both sides, is formed on the lever arm 15a, 15b, in front of the connection element 17a, 17b.

The coupling unit 9 represented comprises a spring bridge 19, which is connected in each case by one of its ends 19a, 19b, to one of the lever arms 15a, 15b, of the first elbow lever 8a. In order to adjust the rigidity of the spring bridge 19, it is divided by notches into three bridge sections. The spring bridge 19 spans over the joint section 16 at the first elbow lever 8a, and is aligned so as to point in the radial direction inwards (direction of arrow C).

Arranged at the spring bridge 19 is a spring arm 20 with a first end 20a. By way of a second end 20b, opposite the first end 20a, of the spring arm 20, the spring arm 20 is connected by its second end to the elbow lever 8b, in the region of the joint section 16. The spring arm 20 is configured as a plate-shaped web element, and extends, going outwards from the second elbow lever 8b, from an underside 14 of the double-elbow lever 6, in the direction towards the upper sides 12a, 12b of the double-elbow lever 6, to the first elbow lever 8a. The spring arm 20 is arranged obliquely to the plane of the double-elbow lever 6 and of the container clamp 1.

The first and second elbow levers 8a, 8b, and the coupling unit 9 are formed as one piece with the spring bridge 19 and the spring arm 20, such as monolithic. As a result, a displacement of the modules transversely to the radial direction B is minimized or prevented. As an alternative, for example, the spring arm 20 can be configured as detachable in the region of the connection to the spring bridge 19, for example such that they can be inserted into one another, wherein the connection must then be or should then be configured accordingly in such a way that a displacement of the spring arm 20 transverse to the radial direction B in the plane of the double-elbow lever 6 at the spring bridge 19 is minimized or prevented.

FIG. 3 further shows a control bolt 10, which is arranged in the region of the joint section 16 of the first elbow lever 8a in the radial direction B outwards (direction of arrow D). With an exemplification of the container clamp 1 as a passive container clamp 1, the control bolt 10 is, for example, mounted fixed at the carrier 11, and the first elbow lever 8a is supported in the region of the joint section 16 at the control bolt 10. On an opening movement of the clamp arms 2a, 2b, the elbow levers 8a, 8b, are bent by the connection elements 17a, 17b, in the radial direction B inwardly in direction C. In this situation the spring bridge 19 is likewise moved in the radial direction inwards C, i.e., onto the second elbow lever 8b. Due to the control bolt 10, the first elbow lever 8a does not carry out any deviational movement in the radial direction D outwards. The second elbow lever 8b is moved, at an opening movement of the clamp arms 2a, 2b, with its joint section 16 in the radial direction D outwards, i.e. onto the first elbow lever 8a. In this situation, by way of the connection of the second elbow lever 8b with the spring arm 20, a compression pressure is exerted via the spring arm 20 onto the spring bridge 19.

After the introduction of a container (not represented here) between the clamp arms 2a, 2b, due to the prevailing compression stress in the coupling unit 9, the lever arms 15a, 15b, are pressed back into their starting position, such that the clamp arms 2a, 2b, hold the container securely. At the removal of the container from the clamp arms 2a, 2b, the same movement sequence again takes place, wherein, by way of the coupling unit 9, a back movement (elastic movement) of the clamp arms 2a, 2b, into their position of rest takes place. Due to the elastic deformation of the coupling unit 9 exclusively in the radial direction B, and due to the double-elbow lever, at each movement of the clamp arms 2a, 2b, an automatic alignment of the clamp arms 2a, 2b in the radial direction B takes place. Accordingly, for the alignment of the clamp arms 2a, 2b, in the radial direction B, no further devices are necessary or desired, such that the container clamp 1, despite the exclusive mounting of the container clamp 1 on two bearing axes 3a, 3b, on the carrier 11, basically grasps the container in a middle position.

With the exemplification of the container clamp 1 as an active container clamp 1, likewise due to the double-elbow lever 6 with the coupling unit 9, an automatic alignment of the clamp arms 2a, 2b, takes place in the radial direction B. In this case, however, the actuation of the clamp arms 2a, 2b, takes place in a different manner to the passive container clamp 1. While with the passive container clamp 1 the opening movement takes place by the pressing in of the container between the clamp arms 2a, 2b, with the active container clamp the control bolt 10 is not mounted at the carrier 11, but, for example, connected to the first elbow lever 8a in the region of the joint section 16. In order to open the container clamp 1 (for example by means of a control curve), the control bolt 10 moves radially outwards, such that the lever arms 15a, 15b, move onto the centering axis A and the clamping arms 2a, 2b, move into their opening position. For closing the container clamp 1, with an active container clamp 1, the control bolt 10 moves back in the radial direction B inwards along direction C, or, respectively, the back movement takes place due to the compressive stress in the coupling unit. Also with the exemplification as an active container clamp 1, an elastic deformation of the coupling unit 9 therefore takes place when the movement is carried out, and an automatic alignment of the clamp arms 2a, 2b, in the radial direction B.

Figure 4:
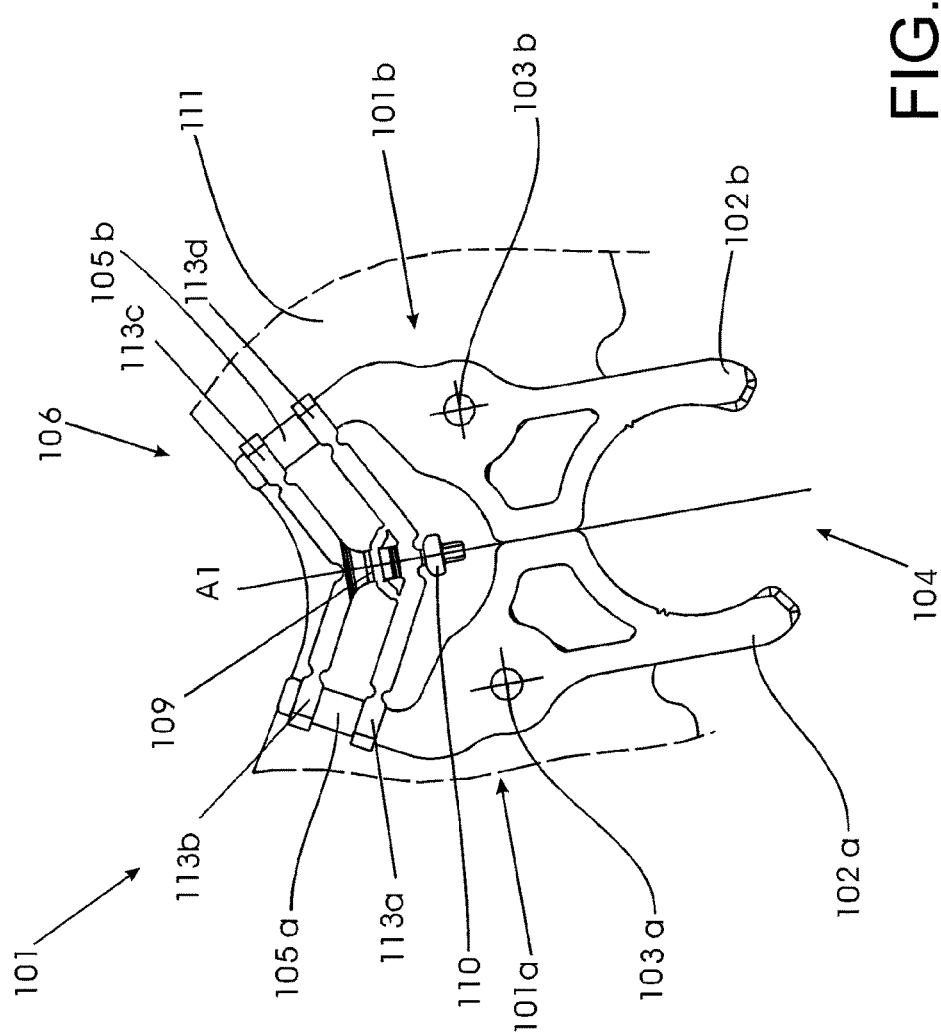
FIG. 4 shows a container clamp according to one possible exemplification.

FIG. 4 shows a possible exemplification of a container clamp 101 for holding containers. The container clamp 101 includes a first clamp portion 101a and a second clamp portion 101b, and has an axis A1. Each clamp portion 101a, 101b is pivotably mounted on a carrier 111, such as a rotary disk or a starwheel, by a corresponding connecting structure 103a, 103b. Each connecting structure 103a, 103b can be in the form of a pin or post that projects from the carrier 111 into an opening in the clamp portion 101*a*, 101*b*. Each clamp portion 101*a*, 101*b* comprises a clamp arm 102*a*, 102*b* at a first end, and a control arm 105*a*, 105*b* at a second end opposite the first end. The clamp arms 102*a*, 102*b* define a gripping or clamping section 104 of the container clamp 101. Containers can be held between the clamp arms 102*a*, 102*b* in the clamping section 104. Connected to the control arms 105*a*, 105*b* is a double-elbow lever arrangement 106, which is shown in detail in FIG. 5. A coupling or connecting unit 109 joins or connects the first elbow lever 108*a* and the second elbow lever 108*b*. A support structure 110 is fixed to the carrier 111. The elbow levers 108*a*, 108*b* are connected to the control arms 105*a*, 105*b* by connector ends 113*a*, 113*b*, 113*c*, and 113*d*. The connector ends 113*a*-*d* can be formed as clip structures 117*a*-*d* that clip onto the control arms 105*a*, 105*b*.

Figure 5:
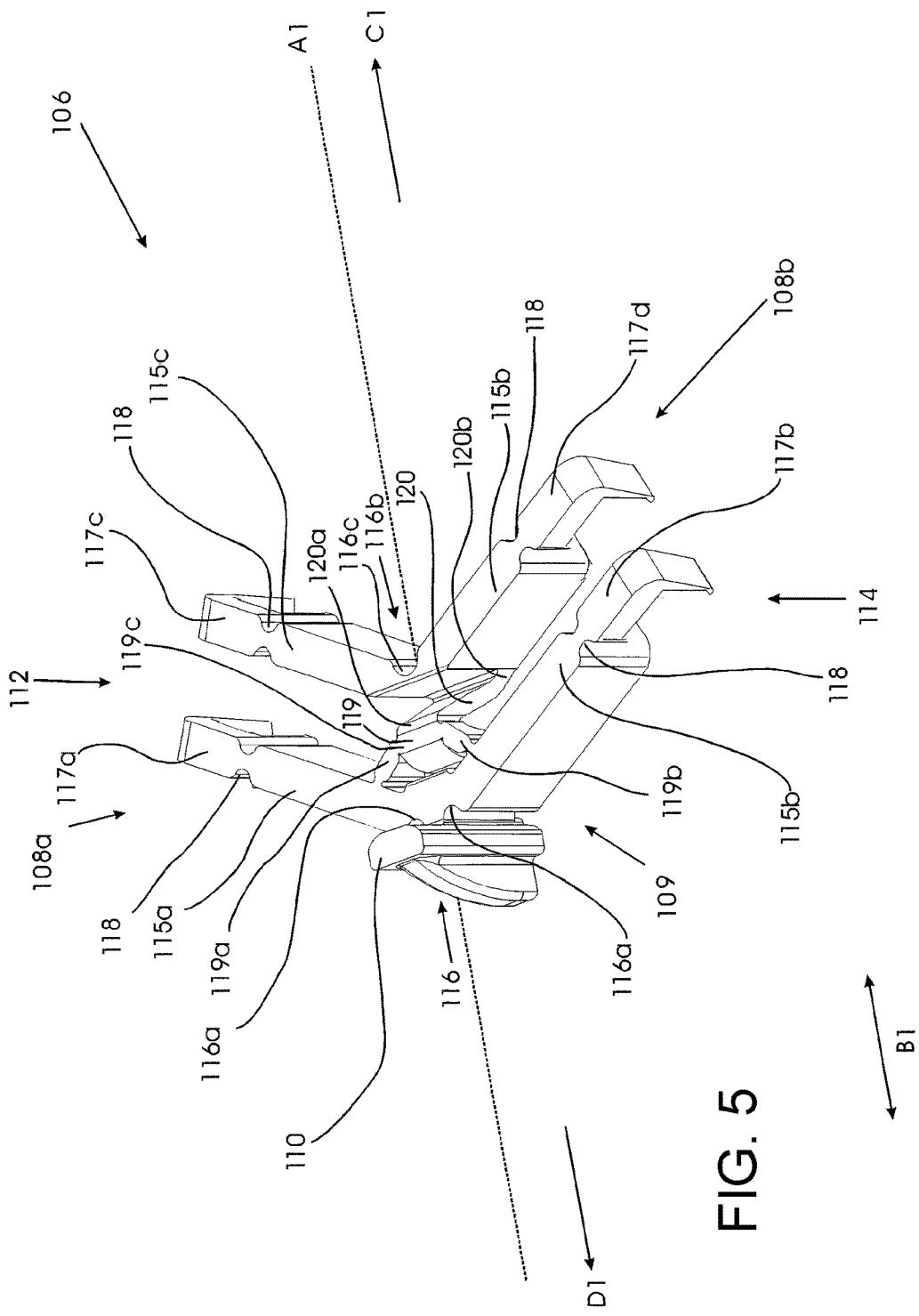
FIG. 5 shows a portion of the container clamp of FIG. 4.

FIG. 5 shows a more detailed view of the double-elbow lever 106. The first elbow lever 108*a* has an angled or substantially V-shaped design comprising two arms or arm sections 115*a*, 115*b* and a joint section 116 that connects or joins the two arms 115*a*, 115*b*. A spring bridge 119 may be positioned near or adjacent the joint section 116. The spring bridge 119 may possibly have a substantially trapezoidal shape or profile with a central section 119*c* and two leg sections 119*a*, 119*b* disposed at an angle to the central section 119*c*. Each of the two leg sections 119*a*, 119*b* of the spring bridge 119 may be connected to a corresponding arm 115*a*, 115*b* of the first elbow lever 108*a*. Both the spring bridge 119 and the first elbow lever 108*a* can be made of a flexible or resilient material. During an opening movement of the clamp arms 102*a*, 102*b*, that is, when the clamp arms 102*a*, 102*b* are moved away from one another to expand the opening therebetween for receiving a container, the control arms 105*a*, 105*b* may be moved toward one another as the clamp arms 102*a*, 102*b* are pivoted about the connecting structures 103*a*, 103*b*. The arms 115*a*, 115*b* of the first elbow lever 108*a* may also be moved toward one another. The joint section 116 of the first elbow lever 108*a* may be braced against or connected to the support structure 110, which is fixed to the carrier 111, to minimize or prevent displacement of the joint section 116 along axis A1 substantially in a direction D1. Since the spring bridge 119 may be located between and connected to the arms 115*a*, 115*b* of the first elbow lever 108*a*, the spring bridge 119 may be compressed or pinched, such that the central section 119*c* of the spring bridge 119 is displaced to protrude or project further away from the support structure 110. It should be noted at this time that the central section 119*c* of the spring bridge 119, in this possible exemplification, can be connected to a first end 120*a* of a spring arm 120. The spring arm 120 may be in the form of a projecting tab, wherein the first end 120*a* is connected to at least the central section 119*c* of the spring bridge 119, and a second end 120*b* is connected to the second elbow lever 108*b*. The second elbow lever 108*b* may be constructed in a similar fashion as the first elbow lever 108*a*, and thus may comprise two arms or arm sections 115*c*, 115*d* and a joint section 116*b*. The first end 120*a* of the spring arm 120 may be connected to an upper part of the spring bridge 119, and the second end 120*b* of the spring arm 120 may be connected to a lower part of the joint section 116*b* of the second elbow lever 108*b*, such that the spring arm 120 is positioned at an angle with respect to the joint section 116*b* of the second elbow lever 108*b*. Since the joint section 116 of the first elbow lever 108*a* may be held in position by the support structure 110, when the spring bridge 119 is displaced it may be moved closer to the second elbow lever 108*b*, and thus the first end 120*a* of the spring arm 120 may also be pressed toward the second elbow lever 108*b* substantially in a direction C1. Since the spring arm 120 normally projects away from the second elbow lever 108*b* due to its resiliency, the displacement of the central section 119*c* of the spring bridge 119 may cause the spring arm 120 to exert an increasing pressing force substantially in the direction D1 as the spring arm 120 is pressed or bent back. The further the spring arm 120 is displaced or pressed in the direction C1, the greater the pressing force that may be exerted by the spring arm 120 in the direction D1. As a result, when the clamp arms 102*a*, 102*b* are opened to receive a container, the clamping force can be increased. Such a design could be advantageous as it could promote a more secure holding of a container. When a container is removed and the clamp arms 102*a*, 102*b* are to be returned to a closed or rest position, the pressing force exerted by the spring arm 120 may at least assist in moving the spring bridge 119, the elbow levers 108*a*, 108*b*, and the clamp arms 102*a*, 102*b* back to their initial positions. The pressing force exerted by the spring arm 120 may decrease as it returns to its original position, and consequently very little force or essentially no force or no force will be exerted on the clamp arms 102*a*, 102*b* or elbow levers 108*a*, 108*b* by the spring arm 120. By relieving or essentially relieving or at least substantially reducing the pressure force on the components of the container clamp 101, the components could possibly experience less wear and tear and thus could possibly have a longer working life.

In order to adjust or control or set the flexibility of the different components of the double-elbow lever 106, notches or cutouts or recesses can be included. For example, pairs of notches 118 can be included at the clip structures 117*a*-*d* for flexibility. Notches 116*a* and 116*c* can be included at the joint sections 116, 116*b* to adjust flexibility at those locations. The deeper or bigger or wider the notches, the greater the flexibility at those points.

The present application relates to a container clamp 1 for gripping a container with clamping arms 2*a*, 2*b* arranged at two bearing axes 3*a*; 3*b*. In order to provide an easily exchangeable and easily cleanable container clamp, which essentially ensures or promotes a reliable automatic centering of the container in the container clamp, it is proposed that a double-elbow lever 6 with an elastic coupling unit 9 is arranged on the clamping arms.

One feature or aspect of an exemplification is believed at the time of the filing of this patent application to possibly reside broadly in a container clamp arrangement configured to clamp and hold containers, such as beverage bottles and cans, comprising: a first clamp portion and a second clamp portion, each comprising: a clamp arm, a control arm, and a connecting structure disposed between said clamp arm and said control arm; said connecting structures being configured to permit said clamp portions to be pivotably mounted on a carrier structure; a biasing arrangement comprising a first angled lever and a second angled lever, each being connected to said control arms; each of said first and second angled levers comprises two arm portions disposed at an angle to one another; said angled levers being configured and disposed to exert a biasing force on said control arms to press said control arms apart from one another and thus press said clamp arms toward one another; said biasing arrangement comprising a resilient connecting arrangement being configured and disposed to connect said first angled lever and said second angled lever; and said resilient connecting arrangement being configured to be temporarily deformed upon movement of said clamp arms apart to generate an increased pressing force on said angled levers, and thus increase said biasing force on said control arms and increase a clamping force on a container disposed between said clamp arms.

Another feature or aspect of an exemplification is believed at the time of the filing of this patent application to possibly reside broadly in the container clamp arrangement, wherein said biasing arrangement is mounted solely on said clamp arms.

Yet another feature or aspect of an exemplification is believed at the time of the filing of this patent application to possibly reside broadly in the container clamp arrangement, wherein said angled levers are configured to generate a biasing force sufficient to hold said clamp arms together upon a container not being held between said clamp arms.

Still another feature or aspect of an exemplification is believed at the time of the filing of this patent application to possibly reside broadly in the container clamp arrangement, wherein said resilient connecting arrangement comprises: a spring bridge connected to said first angled lever; and a spring arm connected to said spring bridge and said second angled lever.

A further feature or aspect of an exemplification is believed at the time of the filing of this patent application to possibly reside broadly in the container clamp arrangement, wherein, upon movement of said clamp arms away from one another, said spring bridge and said spring arm press against one another.

Another feature or aspect of an exemplification is believed at the time of the filing of this patent application to possibly reside broadly in the container clamp arrangement, wherein said spring bridge is connected to said two arm portions of said first angled lever.

Yet another feature or aspect of an exemplification is believed at the time of the filing of this patent application to possibly reside broadly in the container clamp arrangement, wherein said container clamp arrangement comprises a control bolt configured to initiate movement of said first and second clamp portions.

Still another feature or aspect of an exemplification is believed at the time of the filing of this patent application to possibly reside broadly in the container clamp arrangement, wherein said control bolt is configured to be moved toward said clamp arms to move said clamp arms away from one another, and to be moved away from said clamp arms to move said clamp arms toward one another.

A further feature or aspect of an exemplification is believed at the time of the filing of this patent application to possibly reside broadly in the container clamp arrangement, wherein said first and second angled levers are detachably connected to said control arms at the ends of said arm portions of each of said first and second angled levers.

Another feature or aspect of an exemplification is believed at the time of the filing of this patent application to possibly reside broadly in the container clamp arrangement, wherein said first angled lever, said second angled lever, and said resilient connecting arrangement together comprise a one-piece, plastic structure.

One another feature or aspect of an exemplification is believed at the time of the filing of this patent application to possibly reside broadly in a container clamp for grasping a container comprising: two clamp arms $2a$, $2b$, which in each case are mounted so as to be movable by way of a bearing axis $3a$, $3b$ on a carrier $11$ between a resting position and an opening position, a double-elbow lever $6$ connected to the clamp arm $2a$, $2b$, with a first and a second elbow lever $8a$, $8b$, wherein both elbow levers $8a$, $8b$ are connected to a coupling unit $9$, which is elastically movable in the direction of the centering axis A.

Another feature or aspect of an exemplification is believed at the time of the filing of this patent application to possibly reside broadly in the container clamp, wherein the double-elbow lever $6$ is mounted exclusively at the clamp arms $2a$, $2b$.

Yet feature or aspect of an exemplification is believed at the time of the filing of this patent application to possibly reside broadly in the container clamp, wherein the elbow levers $8a$, $8b$ produce a compression strength which holds the clamp arms $2a$, $2b$ in the position of rest.

Still another feature or aspect of an exemplification is believed at the time of the filing of this patent application to possibly reside broadly in the container clamp, wherein the coupling unit $9$ comprises a spring bridge $19$ arranged at the first elbow lever $8a$ and a spring arm $20$ connected to the spring bridge $19$ and the second elbow lever $8b$.

A further feature or aspect of an exemplification is believed at the time of the filing of this patent application to possibly reside broadly in the container clamp, wherein, during an opening movement of the clamping arms $2a$, $2b$, the spring bridge $19$ and the spring arm $20$ press against one another.

Another feature or aspect of an exemplification is believed at the time of the filing of this patent application to possibly reside broadly in the container clamp, wherein the spring bridge $19$ is connected to two lever arms $15a$, $15b$ of the first elbow lever $8a$.

Yet another feature or aspect of an exemplification is believed at the time of the filing of this patent application to possibly reside broadly in the container clamp, wherein a control bolt $10$ is arranged for the actuating of the container clamp $1$.

Still another feature or aspect of an exemplification is believed at the time of the filing of this patent application to possibly reside broadly in the container clamp, wherein, for the opening of the container clamp $1$, the control bolt $10$ can be moved in the direction of a gripper section $4$ of the clamp arms $2a$, $2b$, and for the closing of the container clamp $1$ it can be moved away from the gripper section.

A further feature or aspect of an exemplification is believed at the time of the filing of this patent application to possibly reside broadly in the container clamp, wherein both elbow levers $8a$, $8b$ are secured in each case in a detachable manner to one of the lever arms $15a$, $15b$ at one of the clamp arms $2a$, $2b$.

Another feature or aspect of an exemplification is believed at the time of the filing of this patent application to possibly reside broadly in the container clamp, wherein the first elbow lever $8a$, the second elbow lever $8b$, and the coupling unit $9$ are configured as of one piece, and wherein the double-elbow lever $6$ comprises a plastic.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following patent applications, issued patents, patent publications, and patent documents are hereby incorporated by reference as if set forth in their entirety herein, except for the exceptions indicated herein: DE 1 97 40 891 A1, having the title "Transport star for bottles where a fixed location in grip components is produced," published on Mar. 25, 1999; and DE 322 19 64, having the title "Labelling machine for moulded bottles", published on Feb. 24, 1983.

All of the patents, patent applications, patent publications, and other documents, except for the exceptions indicated herein, which were cited in the International Search Report dated Jan. 14, 2016, and/or cited elsewhere, as well as the International Search Report document itself, are hereby incorporated by reference as if set forth in their entirety herein except for the exceptions indicated herein, as follows: WO 2014/026747, having the title "CONTAINER GRIPPER AND TRANSPORTING ELEMENT WITH SUCH CONTAINER GRIPPERS", published on Feb. 20, 2014; U.S. Pat. No. 8,672,376, having the title "Gripping device", published on Mar. 18, 2014; WO 2009/118579, having the title "RESILIENT CLAMP FOR HOLDING A CONTAINER BY THE NECK", published Oct. 1, 2009; EP 2 138 434 A1, having the title "Gripper and related apparatus for handling objects", published on Dec. 30, 2009; DE 10 2006 033 A1, having the title "TREATMENT MACHINE FOR BOTTLES OR SIMILAR RECEPTACLES", published on Jan. 24, 2008; and U.S. patent application Ser. No. 2006/043749 A1, having the title "Microgripper device for a micro-mechanism", published on Mar. 2, 2006.

The corresponding foreign and international patent publication applications, namely, Federal Republic of Germany Patent Application No. 10 2014 116 004.5, filed on Nov. 3, 2014, having inventor Nils MALLITZKI, and DE-OS 10 2014 116 004.5 and DE-PS 10 2014 116 004.5, and International Application No. PCT/EP2015/073328, filed on Oct. 9, 2015, having WIPO Publication No. WO 2016/071072 and inventor Nils MALLITZKI, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2015/073328 and German Patent Application 10 2014 116 004.5, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2015/073328 and DE 10 2014 116 004.5 from which this patent application claims priority which do not have to do with the correction of the translation in this patent application are not to be included in this patent application in the incorporation by reference.

Any statements about admissions of prior art in the original foreign patent applications PCT/EP2015/073328 and DE 10 2014 116 004.5 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

AT LEAST PARTIAL NOMENCLATURE

1 Container clamp
2a, 2b Clamp arm
3a, 3b Bearing axis
4 Gripper section
5a, 5b Control end
6 Double-elbow lever
7a, 7b Contact surface
8a First elbow lever
8b Second elbow lever
9 Coupling unit
10 Control bolt
11 Carrier
12 Upper side
13a-13d End of elbow lever
14 Underside
15a, 15b Lever arms
16 Joint section
17a-17c Connection element
18 Notch
19 Spring bridge
19a, 19b Spring bridge end
20 Spring arm
20a First end of spring arm
20b Second end of spring arm
A Centering axis
B Radial direction
C Radial direction inwards
D Radial direction outwards

What is claimed is:

1. A container clamp arrangement configured to clamp and hold containers comprising:
   a first clamp portion and a second clamp portion, each comprising: a clamp arm, a control arm, and a connecting structure disposed between said clamp arm and said control arm;
   said connecting structures being configured to permit said clamp portions to be pivotably mounted on a carrier structure;

a biasing arrangement comprising a first angled lever and a second angled lever, each being connected to said control arms;

each of said first and second angled levers comprises two arm portions disposed at an angle to one another;

said angled levers being configured and disposed to exert a biasing force on said control arms to press said control arms apart from one another and thus press said clamp arms toward one another;

said biasing arrangement comprising a resilient connecting arrangement being configured and disposed to connect said first angled lever and said second angled lever; and said resilient connecting arrangement being configured to be temporarily deformed upon movement of said clamp arms apart to generate an increased pressing force on said angled levers, and thus increase said biasing force on said control arms and increase a clamping force on a container disposed between said clamp arms.

2. The container clamp arrangement according to claim 1, wherein said biasing arrangement is mounted solely on said clamp arms.

3. The container clamp arrangement according to claim 2, wherein said angled levers are configured to generate a biasing force sufficient to hold said clamp arms together upon a container not being held between said clamp arms.

4. The container clamp arrangement according to claim 3, wherein said resilient connecting arrangement comprises:
a spring bridge connected to said first angled lever; and
a spring arm connected to said spring bridge and said second angled lever.

5. The container clamp arrangement according to claim 4, wherein, upon movement of said clamp arms away from one another, said spring bridge and said spring arm press against one another.

6. The container clamp arrangement according to claim 5, wherein said spring bridge is connected to said two arm portions of said first angled lever.

7. The container clamp arrangement according to claim 6, wherein said container clamp arrangement comprises a control bolt configured to initiate movement of said first and second clamp portions.

8. The container clamp arrangement according to claim 7, wherein said control bolt is configured to be moved toward said clamp arms to move said clamp arms away from one another, and to be moved away from said clamp arms to move said clamp arms toward one another.

9. The container clamp arrangement according to claim 8, wherein said first and second angled levers are detachably connected to said control arms at the ends of said arm portions of each of said first and second angled levers.

10. The container clamp arrangement according to claim 9, wherein said first angled lever, said second angled lever, and said resilient connecting arrangement together comprise a one-piece, plastic structure.

11. Container clamp for grasping a container comprising:
two clamp arms (2a, 2b), which in each case are mounted so as to be movable by way of a bearing axis (3a, 3b) on a carrier (11) between a resting position and an opening position,
a double-elbow lever (6) connected to the clamp arms (2a, 2b), with a first and a second elbow lever (8a, 8b),
wherein both elbow levers (8a, 8b) are connected to a coupling unit (9), which is elastically movable in the direction of a centering axis (A);
wherein the double-elbow lever (6) is mounted exclusively at the clamp arms (2a, 2b);
wherein the elbow levers (8a, 8b) produce a compression strength which holds the clamp arms (2a, 2b) in the position of rest; and
wherein the coupling unit (9) comprises a spring bridge (19) arranged at the first elbow lever (8a) and a spring arm (20) connected to the spring bridge (19) and the second elbow lever (8b).

12. Container clamp according to claim 11, wherein, during an opening movement of the clamping arms (2a, 2b), the spring bridge (19) and the spring arm (20) press against one another.

13. Container clamp according to claim 12, wherein the spring bridge (19) is connected to two lever arms (15a, 15b) of the first elbow lever (8a).

14. Container clamp according to claim 13, wherein a control bolt (10) is arranged for the actuating of the container clamp (1).

15. Container clamp according to claim 14, wherein, for the opening of the container clamp (1), the control bolt (10) can be moved in the direction of a gripper section (4) of the clamp arms (2a, 2b), and for the closing of the container clamp (1) it can be moved away from the gripper section.

16. Container clamp according to claim 15, wherein both elbow levers (8a, 8b) are secured in each case in a detachable manner to one of the lever arms (15a, 15b) at one of the clamp arms (2a, 2b).

17. Container clamp according to claim 16, wherein the first elbow lever (8a), the second elbow lever (8b), and the coupling unit (9) are configured as of one piece, and wherein the double-elbow lever (6) comprises a plastic.

* * * * *